(12) United States Patent
Her et al.

(10) Patent No.: US 12,482,104 B2
(45) Date of Patent: Nov. 25, 2025

(54) MEDICAL IMAGE ANALYSIS METHOD AND DEVICE USING SAME

(71) Applicant: DDH INC., Seoul (KR)

(72) Inventors: Soo Bok Her, Seoul (KR); Sung Joo Cho, Seoul (KR); Shin Jae Lee, Goyang-si (KR); Dong Yub Ko, Seoul (KR); Jun Ho Moon, Seoul (KR)

(73) Assignee: DDH INC., Seoul (KR)

( * ) Notice: Subject to any disclaimer, the term of this patent is extended or adjusted under 35 U.S.C. 154(b) by 279 days.

(21) Appl. No.: 18/269,927

(22) PCT Filed: May 12, 2021

(86) PCT No.: PCT/KR2021/005920
§ 371 (c)(1),
(2) Date: Jun. 27, 2023

(87) PCT Pub. No.: WO2022/149664
PCT Pub. Date: Jul. 14, 2022

(65) Prior Publication Data
US 2025/0005757 A1    Jan. 2, 2025

(30) Foreign Application Priority Data

Jan. 7, 2021 (KR) .................. 10-2021-0002140

(51) Int. Cl.
*G06F 17/00* (2019.01)
*G06T 7/00* (2017.01)
(Continued)

(52) U.S. Cl.
CPC ............ *G06T 7/0014* (2013.01); *G06V 10/82* (2022.01); *G06V 40/171* (2022.01); *A61C 7/002* (2013.01);
(Continued)

(58) Field of Classification Search
CPC .... G06T 7/0014; G06V 40/171; G06V 10/82; A61C 7/002
See application file for complete search history.

(56) References Cited

U.S. PATENT DOCUMENTS 9,563,821 B2 *   2/2017  Cheon ................. G06V 40/171
10,580,182 B2 *  3/2020  Liu ....................... G06V 40/168
(Continued)

FOREIGN PATENT DOCUMENTS

KR   10-2013-0036526 A   4/2013
KR      10-1599219 B1    3/2016
(Continued)

OTHER PUBLICATIONS

Arik et al., "Fully Automated Quantitative Cephalometry Using Convolutional Neural Networks", Journal of Medical Imaging 4(1), (Jan.-Mar. 2017), p. (014501-1)-(014501-11).
(Continued)

*Primary Examiner* — Mohammed H Zuberi
(74) *Attorney, Agent, or Firm* — Bridgeway IP Law Group, PLLC; Sang Ho Lee; Hyun Woo Shin

(57) ABSTRACT

Provided is a computing device for supporting medical image analysis. The computing device may include: at least one or more memories for storing a program composed of one or more modules for performing medical image analysis; a communication unit for acquiring a medical image and a facial image for a patient's head; and at least one processor for detecting a plurality of feature points from the facial image through a feature point detection module performing artificial neural network-based machine learning to thus superimpose the medical image and the facial image on top of each other with respect to a plurality of first feature points displayed on the medical image and a plurality of second feature points as at least some of the feature points detected from the facial image, wherein the first feature points are
(Continued)

anatomical reference points indicating relative positions of at least one of facial skeleton, teeth, and facial contour.

14 Claims, 8 Drawing Sheets

(51) Int. Cl.
  *G06V 10/82* (2022.01)
  *G06V 40/16* (2022.01)
  *A61C 7/00* (2006.01)
(52) U.S. Cl.
  CPC ............... *G06T 2207/20081* (2013.01); *G06T 2207/20084* (2013.01); *G06T 2207/30036* (2013.01); *G06T 2207/30201* (2013.01)

(56) References Cited

U.S. PATENT DOCUMENTS

| | | | |
|---|---|---|---|
| 10,898,298 B1* | 1/2021 | Raslambekov | A61B 6/032 |
| 2012/0182294 A1* | 7/2012 | Cordon Garcia | G06T 19/00 |
| | | | 345/419 |
| 2013/0328869 A1* | 12/2013 | Choi | G06T 19/20 |
| | | | 345/419 |
| 2017/0135663 A1* | 5/2017 | Dascal | G06T 7/33 |
| 2018/0174367 A1* | 6/2018 | Marom | G06T 19/006 |
| 2019/0254790 A1* | 8/2019 | Lancelle | A61C 13/34 |
| 2020/0273184 A1* | 8/2020 | Dufour | A61B 8/4254 |
| 2020/0342603 A1* | 10/2020 | Orasanu | G06T 7/10 |
| 2021/0150714 A1* | 5/2021 | Buerger | A61B 5/055 |
| 2021/0346091 A1* | 11/2021 | Haslam | G16H 30/40 |
| 2022/0122717 A1* | 4/2022 | Budz | G16H 30/40 |

FOREIGN PATENT DOCUMENTS

| | | |
|---|---|---|
| KR | 10-2019-0096575 A | 8/2019 |
| KR | 10-2019-0137388 A | 12/2019 |
| KR | 10-2099390 B1 | 4/2020 |
| KR | 10-2020-0083822 A | 7/2020 |

OTHER PUBLICATIONS

Shumeng Wang et al., "A novel contour-based registration of lateral cephalogram and profile photograph," Computerized Medical Imaging and Graphics, 63 (2018), pp. 9-23.

* cited by examiner

MEDICAL IMAGE ANALYSIS METHOD AND DEVICE USING SAME

TECHNICAL FIELD

The present invention relates to a medical image analysis method and a device using the same.

BACKGROUND ART

Generally, an occlusion is a state in which the upper and lower teeth come together when the mouth is closed. A malocclusion is a misalignment or incorrect relation between the teeth of the upper and lower dental arches when they approach each other, thereby leading to functional and aesthetic problems of the teeth.

It is usually known that malocclusion is hereditary, but it may happen by various causes such as shapes or sizes of teeth, environmental impacts, bad habits, wrong postures, dental caries, birth defects, and the like.

If malocclusion happens, the teeth are not aligned, so food particles may be easily caught between them. Further, it is not easy to clean the teeth through accurate tooth brushing, and accordingly, the dental plaque grows in the mouth, thereby resulting in dental caries and gum diseases such as gum inflammation. Furthermore, if there are teeth misaligned from normal teeth arrangements or if the jaw is abnormally positioned, the teeth may be fractured or damaged if external impacts are applied to them.

To treat the malocclusion, accordingly, an orthodontic treatment is performed. In this case, the orthodontic treatment is performed using the moving properties of teeth upon the application of an external force to them. The orthodontic treatment makes use of various devices and methods according to causes or treatment periods, and for example, the devices are classified into a device for suppressing or developing the growth of upper and lower jaw bones and a device for slowly moving the teeth to desired positions.

To allow the orthodontic treatment to be performed properly for a patient, the patient's face shape is first determined. To determine the face shape (that is, to perform orthodontic diagnosis), a cephalometric analysis method, as shown in FIG. 1, is generally used.

The cephalometric analysis method is a method for determining the face shape for orthodontic treatment using anatomical reference points representing relative positions of the facial skeleton, teeth, facial contour, and the like, and while an orthodontist is seeing the cephalogram of a patient who requires the orthodontic treatment, he or she marks reference points as needed manually and determines the patient's face shape based on relative angles of straight lines connecting the reference points.

According to the conventional method, however, the orthodontist arbitrarily marks the needed reference points according to his or her academic features, and accordingly, the reference points used for the determination of the face shape are different according to orthodontists, so it is hard to standardize and share the reference points. Further, the reference points are marked one by one manually by the orthodontist to cause a lot of time to be consumed, and a deviation in the accuracy of the reference points may be generated according to the skill of the orthodontist.

To solve such problems, a method for automatically detecting a plurality of measuring points from a patient's dental image using artificial neural network-based machine learning and a device using the same are disclosed in Korean Patent No. 10-2099390.

As a result, accuracy, convenience, and speed in orthodontic diagnosis are improved, but there is a need to provide an improved method for matching a patient's facial image to detect measuring points accurately and rapidly to predict the facial changes after the orthodontic treatment.

DISCLOSURE

Technical Problem

Accordingly, it is an object of the present invention to provide a medical image analysis method and a device using the same that is capable of automatically superimposing and aligning a medical image and a facial image.

The technical problems of the multi-modality medical image analysis method and device to be achieved through the present invention are not limited as mentioned above, and other technical problems not mentioned herein will be obviously understood by one of ordinary skill in the art through the following description.

Technical Solution

To accomplish the above-mentioned objects, according to an aspect of the present invention, there is provided a computing device for supporting medical image analysis. The computing device may include at least one or more memories for storing a program composed of one or more modules for performing medical image analysis; a communication unit for acquiring a medical image and a facial image for a patient's head; and at least one processor for detecting a plurality of feature points from the facial image through a feature point detection module performing artificial neural network-based machine learning to thus superimpose the medical image and the facial image on top of each other with respect to a plurality of first feature points displayed on the medical image and a plurality of second feature points as at least some of the feature points detected from the facial image, wherein the first feature points are anatomical reference points indicating relative positions of at least one of the facial skeleton, teeth, and facial contour.

Further, the at least one processor may control the feature point detection module so that the feature point detection module performs learning from learning data accumulated with a plurality of different images from which the second feature points are read by a specialist.

Furthermore, the at least one processor may control an image superimposition module performing learning from learning data accumulated with images on which the medical image and the facial image are superimposed on top of each other with respect to the first feature points and the second feature points so that the medical image and the facial image are superimposed on top of each other.

Also, the image superimposition module may match the first feature points to the second feature points through the application of Mean Squared Error (MSE), and Weighted Mean Squared Error (WMSE) may be applied to the first feature points and the second feature points included in a predetermined area around the mouth.

The image superimposition module may calculate an offset value from a specific reference point, enlargement/reduction rates, and rotation angle so that distances between the first feature points and the second feature points are minimized, and based on the calculated values, the image superimposition module may superimpose the medical image and the facial image on top of each other.

The feature point detection module may detect a plurality of boundary boxes in which it is expected that at least some of the individual anatomical features corresponding to the first feature points from the medical image and determine given points included in at least some of the detected boundary boxes as the first feature points.

The feature point detection module may detect a plurality of landmarks from the facial image and then detect the plurality of feature points through a landmark detection technique in which at least some of the points corresponding to the detected landmarks are determined as the plurality of feature points.

The feature point detection module may detect a plurality of boundary boxes in which it is expected that at least some of individual facial features corresponding to the plurality of feature points exist from the facial image and then detect the plurality of feature points through an object detection technique in which given points included in at least some of the detected boundary boxes are determined as the feature points.

To accomplish the above-mentioned objects, according to another aspect of the present invention, there is provided a medical image analysis method. The medical image analysis method may include the steps of: acquiring a medical image and a facial images for a patient's head; detecting a plurality of feature points from the facial image through a feature point detection module performing artificial neural network-based machine learning; and superimposing the medical image and the facial image on top of each other with respect to a plurality of first feature points displayed on the medical image and a plurality of second feature points as at least some of the feature points detected from the facial image, wherein the first feature points are anatomical reference points indicating relative positions of at least one of facial skeleton, teeth, and facial contour.

The method according to the present invention may further include the step of allowing the feature point detection module to perform learning from learning data accumulated with a plurality of different images from which the second feature points are read by a specialist.

The step of superimposing the medical image and the facial image on top of each other may be carried out by controlling an image superimposition module performing learning from learning data accumulated with images on which the medical image and the facial image are superimposed on top of each other with respect to the first feature points and the second feature points so that the medical image and the facial image are superimposed on top of each other.

The image superimposition module may match the first feature points to the second feature points through the application of Mean Squared Error (MSE), and Weighted Mean Squared Error (WMSE) may be applied to the first feature points and the second feature points included in a predetermined area around the mouth.

The image superimposition module may calculate an offset value from a specific reference point, enlargement/reduction rates, and rotation angle so that distances between the first feature points and the second feature points are minimized, and based on the calculated values, the image superimposition module may superimpose the medical image and the facial image on top of each other.

The feature point detection module may detect a plurality of boundary boxes in which it is expected that at least some of the individual anatomical features corresponding to the first feature points from the medical image and determine given points included in at least some of the detected boundary boxes as the first feature points.

The feature point detection module may detect a plurality of landmarks from the facial image and then detect the plurality of feature points through a landmark detection technique in which at least some of the points corresponding to the detected landmarks are determined as the plurality of feature points.

The feature point detection module may detect a plurality of boundary boxes in which it is expected that at least some of individual facial features corresponding to the plurality of feature points exist from the facial image and then detect the plurality of feature points through an object detection technique in which given points included in at least some of the detected boundary boxes are determined as the feature points.

Advantageous Effects of the Invention

According to the present invention, the plurality of feature points matched to one another are detected from the medical image and the facial image, and based on the detected feature points, the medical image and the facial image are automatically superimposed on top of each other and then aligned and displayed.

BRIEF DESCRIPTION OF DRAWINGS

Now, a brief description of the drawings is given to allow the drawings suggested in the present invention to be more clearly understood.

MODE FOR DISCLOSURE

Figure 1:
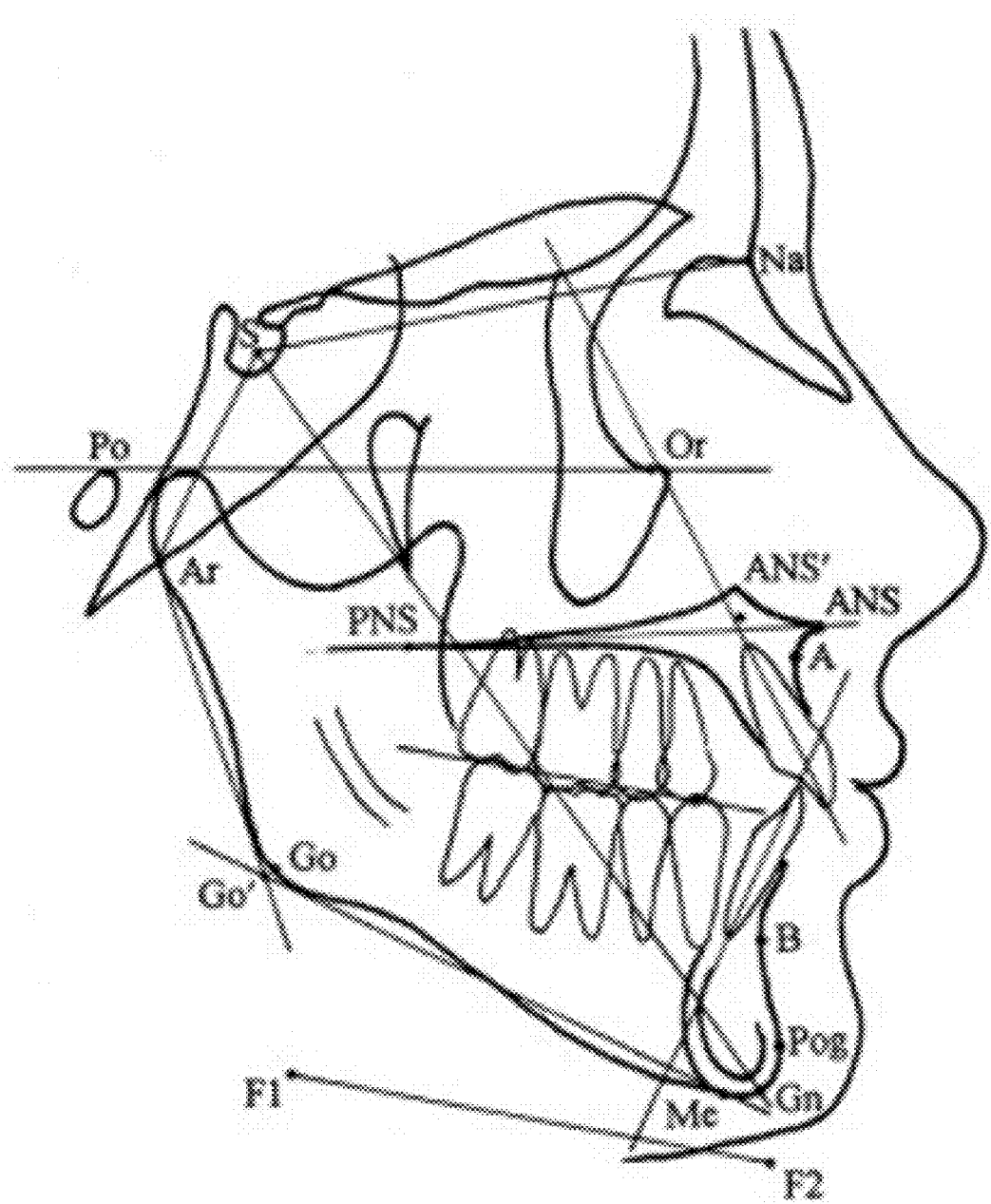
FIG. 1 is a schematic view showing conventional cephalometric analysis.

Hereinafter, example embodiments will be described with reference to the accompanying drawings; however, for reference numerals, with respect to the same elements, even though they may be displayed in different drawings, such elements use the same reference numerals as much as possible. Also, in explaining the example embodiments, detailed descriptions of known elements or functions will be omitted if it is determined that such descriptions will interfere with the understanding of the embodiments. In addition, the example embodiments may be embodied in different forms and should not be construed as limited to the embodiments set forth herein but may be modified and variously implemented by those skilled in the art.

Figure 2:
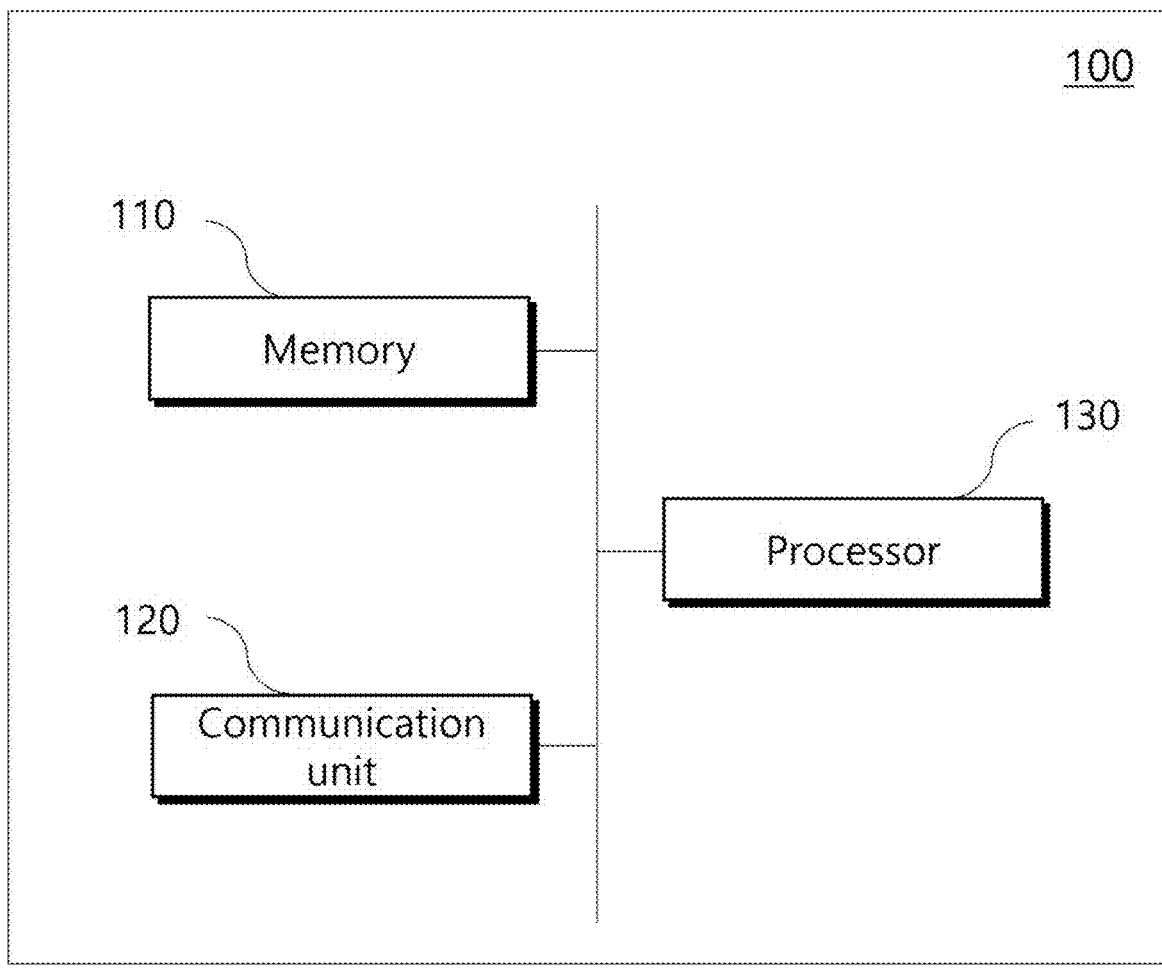
FIG. 2 is a block diagram showing a computing device for executing a medical image analysis method according to an embodiment of the present invention.

When it is said that one element is described as being "connected" or "coupled" to the other element, one element may be directly connected or coupled to the other element, but it should be understood that another element may be present between the two elements. It will be understood that when a part "includes" an element, it does not mean that other elements are excluded but that other elements may be further included. Also, in explaining elements, terms like "first", "second", "A", "B", "(a)", "(b)", etc. may be used. However, such terms are used to distinguish one from the others only and they do not affect the essence, nature, sequence, order, etc FIG. 2 is a block diagram showing a computing device for executing a medical image analysis method according to an embodiment of the present invention.

A computing device 100 according to an embodiment of the present invention includes a memory 110, a communication unit 120, and a processor 130 and performs direct and indirection communication with an external computing device (not shown) through the communication unit 120.

In specific, the computing device 100 may include a combination of computer hardware (e.g., devices including a computer processor, a memory, a storage, an input and output device, and other existing components of the computing device, electronic communication devices such as router, switch, and the like, network accessible storage (NAS), and electronic information storage such as storage area network (SAN)) and computer software (e.g., instructions allowing the computing device to be performed in a given manner) to accomplish desired performance of a system.

The communication unit 120 of the computing device 100 transmits and receives requests and responses to and from other computing devices interworking with the computing device 100. For example, the requests and responses are transmitted and received through the same TCP session, but they may be transmitted and received through User Datagram Protocol (UDP), without being limited thereto. In addition, in a broad sense, the communication unit 120 includes a keyboard, a mouse, and other external inputting devices, through which commands or instructions are received.

The computing device 100 acquires a medical image and a facial image of the head of a patient as an image analysis subject through the communication unit 120. In this case, the medical image is the radiography image of the head (particularly, side of the head), but it may not be limited thereto.

Further, the memory 110 of the computing device 100 stores various data for operating the computing device 100. In specific, the memory 110 stores a program with one or more modules to perform medical image analysis. As known to a person having ordinary skill in the art, the memory 110 serves as a storage device to and from which information is inputted and outputted, such as a Hard Disk Drive (HDD), a Read Only memory (ROM), a Random Access Memory (RAM), an Electrically Erasable Programmable ROM (EEPROM), a flash memory, a Compact Flash (CF) card, a Secure Digital (SD) card, a Smart Media (SM) card, a Multimedia Card (MMC), and a memory stick, and the memory 110 is disposed in the computing device 100 or in a separate device.

Further, the processor 130 of the computing device 100 controls all of the operations of the computing device 100 and includes a hardware configuration such as a Micro Processing Unit (MPU), a Central Processing Unit (CPU), a Cache Memory, a Data Bus, or the like. In addition, the processor 130 includes software configurations such as an operating system, an application for executing a specific purpose, and the like.

According to an embodiment of the present invention, the processor 130 detects a plurality of feature points from the facial image through a feature point detection module for performing artificial neural network-based machine learning and superimposes the medical image and the facial image on top of each other with respect to the plurality of feature points as at least some of the plurality of feature points displayed on the medical image and the plurality of feature points detected from the facial image.

To do this, the computing device 100 further includes a display unit (not shown) for displaying an image made by superimposing the medical image and the facial image on top of each other.

A method for detecting the feature points from the medical image and the facial image and superimposing the medical image and the facial image on top of each other under the control of the processor 130 will be explained in detail with reference to FIGS. 3 to 7.

Figure 3:
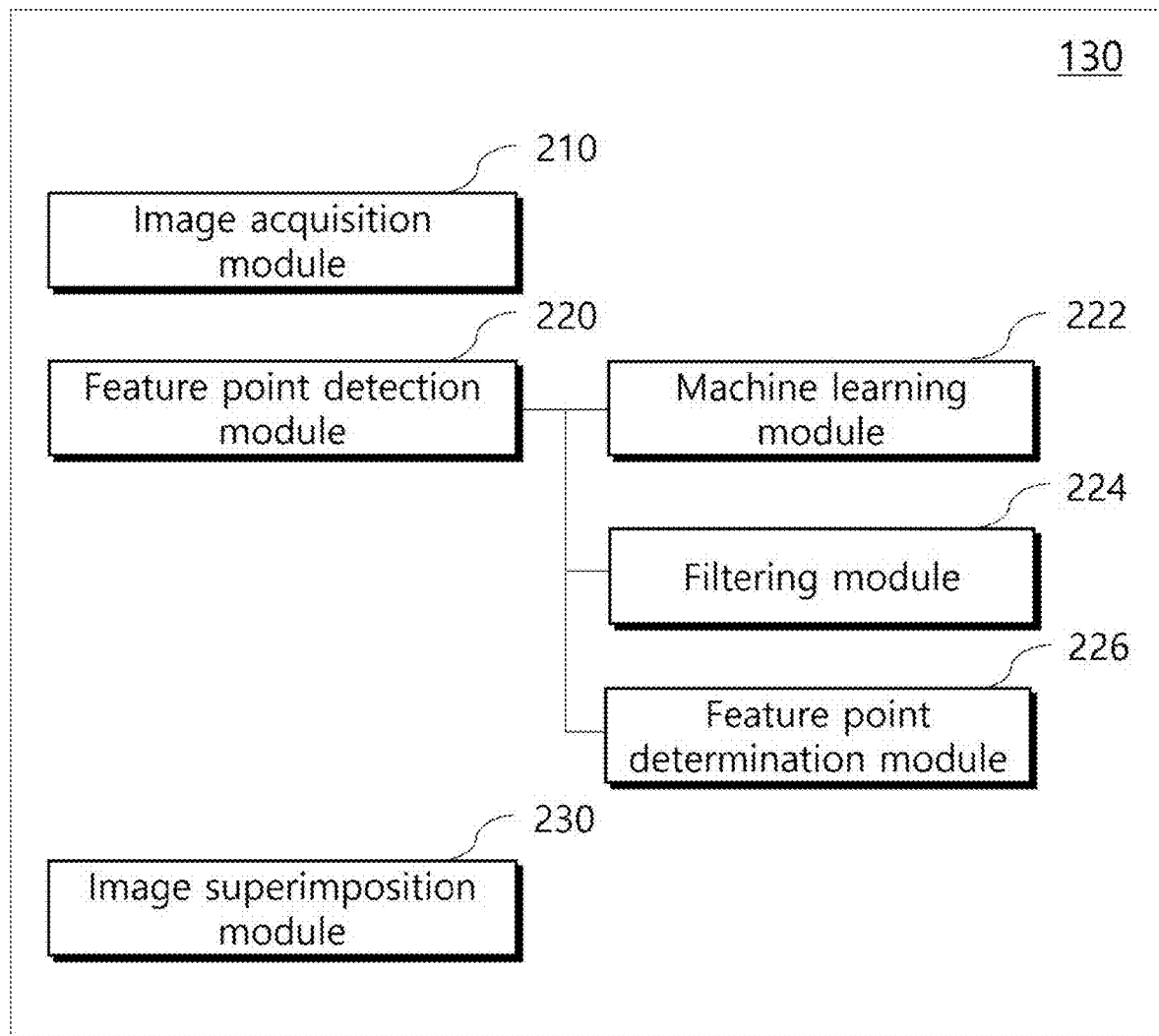
FIG. 3 is a block diagram showing hardware and software architecture of the computing device for executing the medical image analysis method according to the embodiment of the present invention.

FIG. 3 is a block diagram showing the hardware and software architecture of the computing device for executing the medical image analysis method according to the embodiment of the present invention.

Referring to FIG. 3, the processor 130 of the computing device 100, according to the present invention, includes an image acquisition module 210, a feature point detection module 220, and an image superimposition module 230. For example, the respective modules operate by the processor 130, the memory 110, and/or the communication unit 120 or interwork with them.

The image acquisition module 210 serves to acquire the medical image and the facial image of the patient from an external computing device, another device (medical imaging device) interworking with the computing device 100, or an external storage medium through the communication unit 120.

For example, the medical image is a cephalometric radiograph obtained by imaging the lateral view of the head of the patient through an X-ray, and the facial image is the lateral view image of the head of the patient obtained through a camera.

The image acquisition module 210 resizes the size of the acquired medical image as a pre-processing for the medical image, and transmits the pre-processed medical image to the feature point detection module 220.

The feature point detection module 220 serves to detect the plurality of feature points from the medial image and the facial image. Hereinafter, the feature points detected from the medical image are called first feature points, and the feature points detected from the facial image second feature points, for the convenience of description.

The first feature points represent anatomical reference points indicating relative positions of at least one of facial skeleton, teeth, and facial contour, and the number of first feature points is N determined by a user or as default, desirably, 80. According to the present invention, the first feature points are anatomical reference points used for orthodontic diagnosis.

The feature point detection module 220 includes a machine learning module 222, a filtering module 224, and a feature point determination module 226.

The machine learning module 222 serves to simultaneously detect a plurality of objects from video or image and is based on an artificial neural network, particularly Convolution Neural Network (CNN) or CNN-modified/improved artificial neural network.

According to the present invention, the machine learning module 222 is a single convolution network so that the plurality of objects can be quickly detected simultaneously. For example, an artificial neural network using an object detection technique such as You Only Look Once (YOLO) framework is applied, but without being limited thereto, various algorithms or artificial neural networks adequate for the detection of a plurality of objects, such as SSD, R-CNN, and the like may be applied.

The machine learning module 222 includes a plurality of convolutional layers and a plurality of fully connected layers. In this case, the plurality of convolutional layers serve to perform the abstraction of the image to extract features, and the plurality of fully connected layers serve to predict the output probabilities of the detected objects and the coordinates of boundary boxes for detecting the objects.

According to the present invention, the machine learning module 222 identifies (or detects) individual anatomical features corresponding to the plurality of first feature points from the medical image through the boundary boxes.

Figure 5:
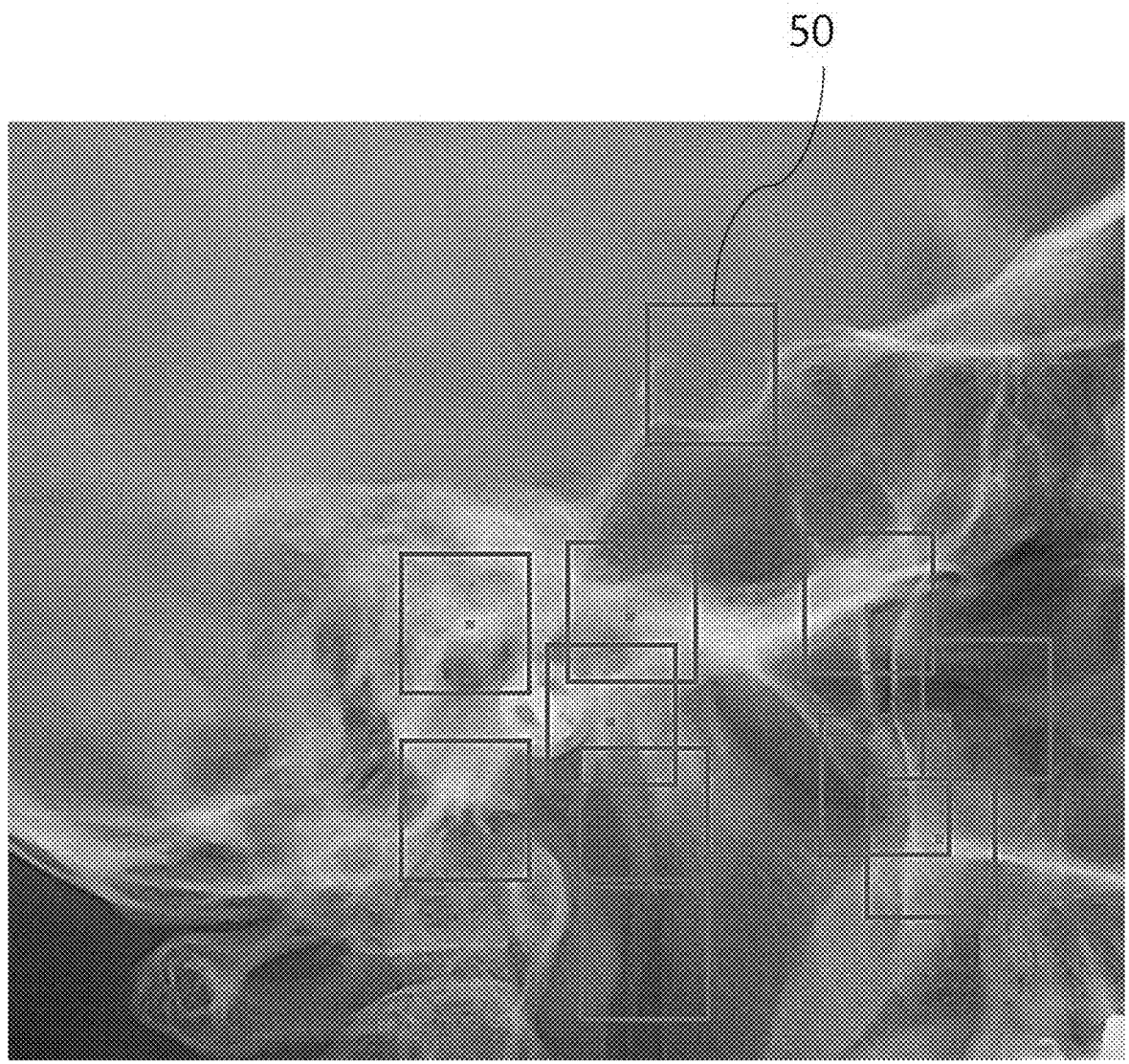
FIG. 5 is an exemplary view showing boundary boxes for feature point detection on the medical image according to the present invention.
Figure 6:
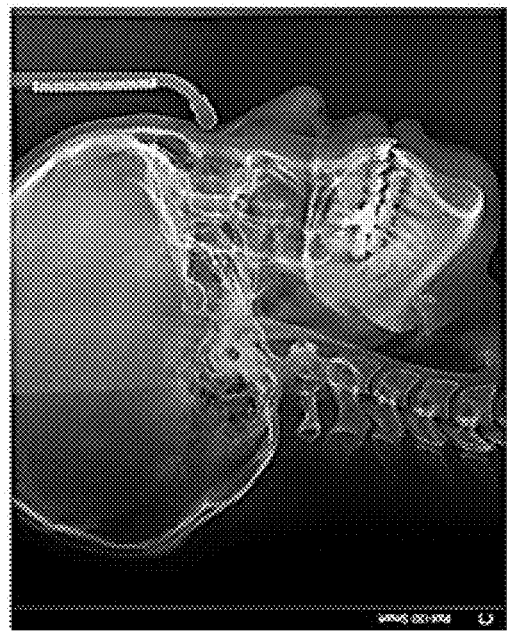
FIG. 6 is an exemplary view showing a process of detecting feature points from a facial image according to the present invention.
Figure 6:
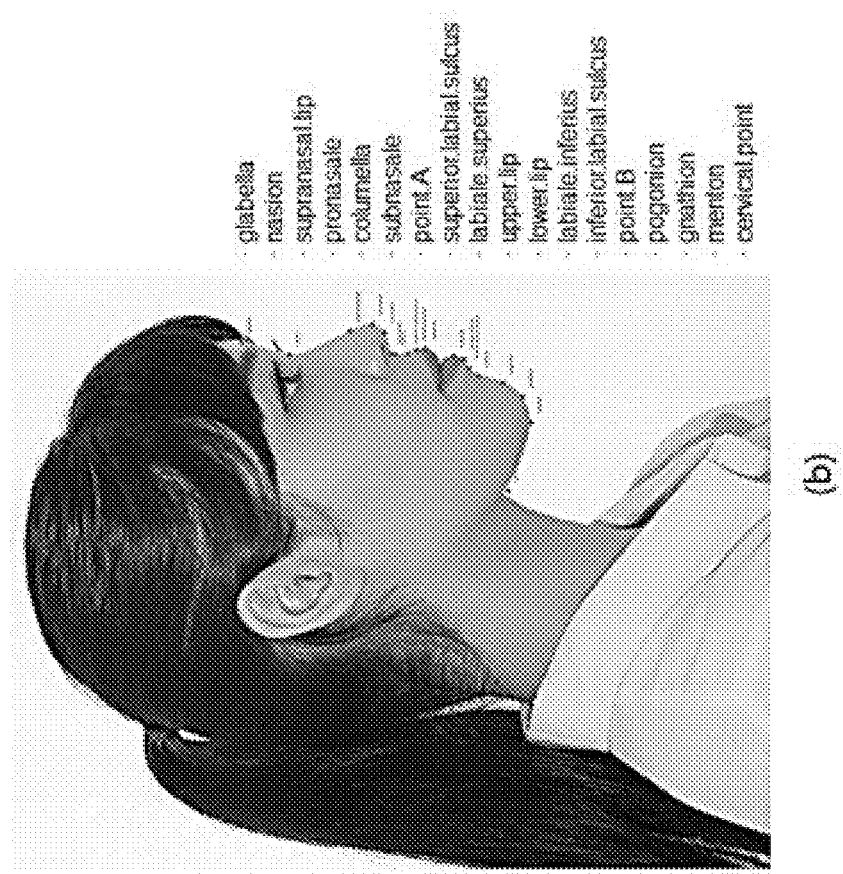

Referring to FIG. 5, the plurality of boundary boxes 50 are defined as areas in which the individual anatomical features corresponding to the plurality of first feature points are identified from the medical image. In this case, the size of each area for defining the individual anatomical features is desirably set to 30×30 pixels to maximize the accuracy in detection.

In this case, the machine learning module 222 divides the medical image into a plurality of cells and assigns a given number of boundary boxes to each cell, and if the individual anatomical features exist in a specific cell, the boundary boxes assigned to the specific cell identify the individual anatomical features.

Accordingly, the machine learning module 222 predicts the boundary boxes in which the individual anatomical features corresponding to the plurality of first feature points are detected from the medical image, the coordinates and sizes of the corresponding boundary boxes, and the existence probabilities of the individual anatomical features in the boundary boxes.

The filtering module 224 serves to filter the boundary boxes detected by the machine learning module 222, based on the existence probabilities of the individual anatomical features in the boundary boxes. In specific, if two or more boundary boxes for one individual anatomical feature are detected, the filtering module 224 selects one from the two or more boundary boxes, as the boundary box in which the individual anatomical feature exists, based on the existence probabilities.

The feature point determination module 226 determines given points included in the finally selected boundary boxes through the filtering results as the first feature points. For example, the feature point determination module 226 determines the center coordinates of the respective boundary boxes as the first feature points.

Accordingly, as mentioned above, the machine learning module 222 outputs information on the center coordinates (relative coordinates of each cell) of each boundary box, the size (width and height) of each boundary box, and the existence probability of the individual anatomical feature.

Further, the feature point detection module 220 detects the plurality of second feature points from the facial image in the same manner as above. The feature point detection module 220 learns data accumulated with a plurality of different facial images, from which the second feature points are read by a specialist through machine learning.

In this case, the feature point detection module 220 detects a plurality of landmarks from the facial image and then detects the second feature points through a landmark detection technique in which at least some of the points corresponding to the detected landmarks are determined as the feature points.

FIG. 6a shows the medical image of the patient, and FIG. 6b shows the facial image of the patient. As shown in FIG. 6b, a plurality of landmarks are detected as the feature points from the facial image of the patient. The landmarks represent coordinates distributed on the eye, nose, mouth, jawline, and eyebrow around the face outline, and under current technologies, 68 landmarks can be detected.

Some of landmarks detected, which can be matched to the first feature points of the medical image, are determined as the second feature points.

According to another embodiment of the present invention, further, the feature point detection module 220 detects a plurality of boundary boxes in which it is expected that at least some of the learned individual facial features corresponding to the plurality of second feature points exist from the facial image and then detects the second feature points from at least some of the detected boundary boxes through an object detection technique in which given points included in the boundary boxes are determined as the feature points.

The image superimposition module 230 serves to superimpose the medial image from which the first feature points are detected and the facial image from which the second feature points are detected on top of each other with respect to the first feature points and the second feature points and thus produce the superimposed image.

Figure 7:
FIG. 7 is an exemplary view showing an image obtained by superimposing the medical image and the facial image on top of each other according to the present invention.

The image superimposition module 230 performs learning from learning data accumulated with images on which the medical image and the facial image are superimposed on top of each other with respect to the first and second feature points by the specialist, through the machine learning, and based on the learning, as shown in FIG. 7, the medical image and the facial image are automatically superimposed on top of each other. In FIG. 7, yellow points represent the first feature points of the medical image, and red points the second feature points of the facial image. To enhance the accuracy in alignment, a wire frame connected to the first feature points according to positions of bones and muscles is built with a blue line.

In this case, the image superimposition module 230 matches the first feature points to the second feature points through the application of Mean Squared Error (MSE), and in specific, the first and second feature points matched to one another have superimposed distances having minimized MSE, so that the medical image and the facial image are aligned to be superimposed to the maximum.

It is important to obtain high accuracy in alignment around the mouth as an orthodontic surgery area, and accordingly, desirably, Weighted Mean Squared Error (WMSE) for applying a weight value to deviation and variance of the MSE is applied to the first feature points and the second feature points included in a predetermined area around the mouth.

The image superimposition module 230 calculates an offset value from a specific reference point (for example, leftmost point), enlargement/reduction rates, and rotation angle so that the distances between the first and second feature points are minimized, and based on the calculated values, the image superimposition module 230 automatically superimposes the medical image and the facial image on top of each other through the enlargement, rotation, and alignment of the images.

In addition, a storage and transmission module (not shown) stores the learning data (e.g., medical images for comparison) for learning of the machine learning module 222, the medical image of the patient, and the feature point detection results in the memory 110 or transmits the stored data to the external computing device, the display device, and the like through the communication unit 120.

Figure 4:
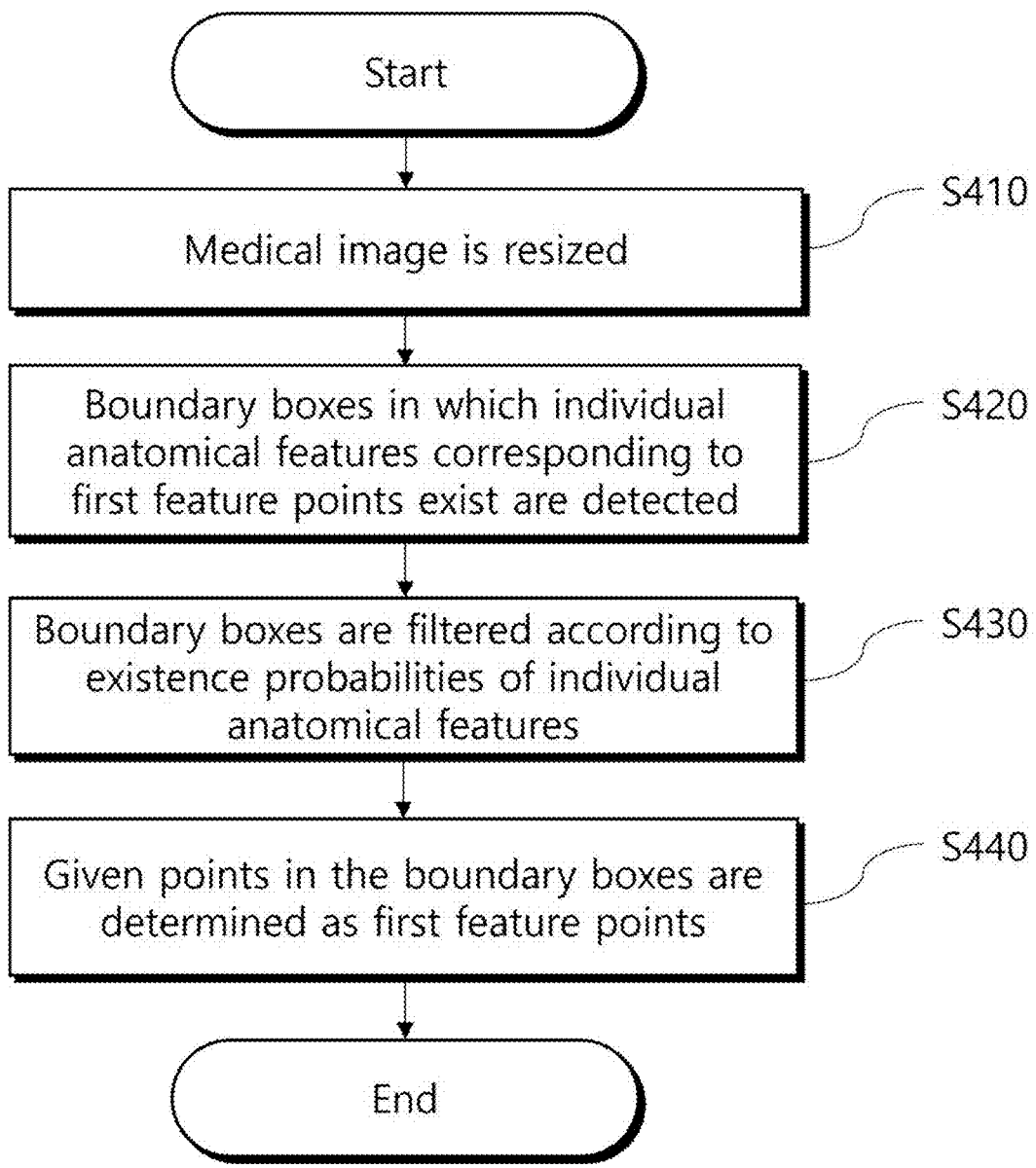
FIG. 4 is a flowchart showing a method for detecting feature points from a medical image according to the present invention.

FIG. 4 is a flowchart showing a method for detecting the feature points from the medical image according to the present invention.

At step S410, first, the feature point detection module 220 determines whether the medical image satisfies a given quality and resizes the medical image satisfying the given quality, thereby completing the pre-processing of the medical image. In specific, the feature point detection module 220 enlarges or reduces the medical image of the patient to the same scale or rate as the pre-learned medical images by the machine learning module 222. As a result, the medical image analysis method according to the present invention can improve the detection accuracy of the machine learning module 222. It is desirable that the medical image be resized to 416×640 pixels.

At step S420, the machine learning module 222 detects the plurality of boundary boxes in which it is expected that at least some of individual anatomical features corresponding to the plurality of feature points exist from the medical image of the patient, based on the plurality of medical images accumulated for comparison, and then calculates the existence probabilities of the individual anatomical features in the boundary boxes.

According to the present invention, at the step S420, three-step detection is performed according to the degree of abstraction of the medical image. That is, the medical image of the patient is abstracted to different levels through a plurality of convolution layers included in the machine learning module 222, and the machine learning module 222 detects the boundary boxes including the individual anatomical features from the different three abstraction levels and calculates the existence probabilities of the individual anatomical features.

As a result of the step S420, the center coordinates and sizes of the boundary boxes and the existence probabilities of the individual anatomical features are produced as output values.

At step S430, the filtering module 224 performs the filtering for the boundary boxes based on the existence probabilities of the individual anatomical features. For example, if the three-step detection at the step S420 is applied to detect two or more boundary boxes for one individual anatomical feature, the filtering module 224 selects one boundary box among the plurality of boundary boxes, as the boundary box in which the corresponding individual anatomical feature exists, based on the existence probabilities. According to an embodiment of the present invention, the filtering module 224 selects one boundary box having the highest existence probability in the corresponding individual anatomical feature among the plurality of boundary boxes.

At step S440, the feature point determination module 226 determines one point of each filtered boundary box as the coordinates of the first feature point. For example, the feature point determination module 226 determines the center coordinates of the detected boundary boxes corresponding to the individual anatomical features as the coordinates of the first feature points.

Figure 8:
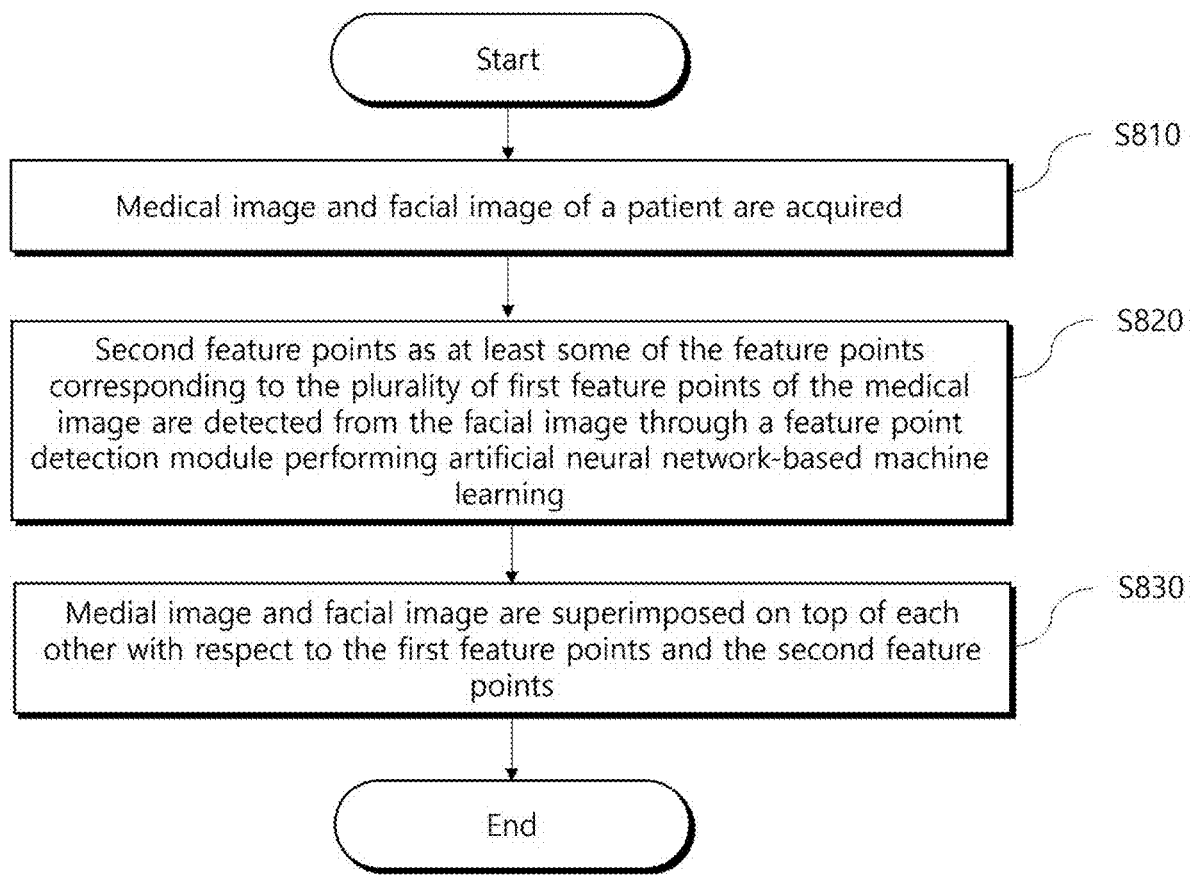
FIG. 8 is a flowchart showing a medical image analysis method according to the present invention.

FIG. 8 is a flowchart showing a medical image analysis method according to the present invention.

First, the medical image and facial image of the patient are acquired (at step S810).

Next, the second feature points as at least some of the feature points corresponding to the plurality of first feature points of the medical image are detected from the facial image through the feature point detection module performing the artificial neural network-based machine learning (at step S820). In this case, the feature point detection module performs the learning for the learning data accumulated with a plurality of different facial images from which the second feature points are read by the specialist, through the machine learning.

Further, the medical image is resized and thus pre-processed, and through the feature point detection module, the first feature points are detected from the pre-processed medical image and displayed on the medical image. In this case, the plurality of boundary boxes in which it is expected that at least some of the individual anatomical features corresponding to the first feature points exist are detected from the medical image, and the given points included in at least some of the detected boundary boxes are determined as the first feature points.

In the case of the second feature points, further, the plurality of landmarks are detected from the facial image, and the second feature points are detected through a landmark detection technique in which at least some of the points corresponding to the detected landmarks are determined as the feature points. Otherwise, the plurality of boundary boxes in which it is expected that at least some of individual facial features corresponding to the plurality of feature points exist are detected from the facial image, and the second feature points are detected from at least some of the detected boundary boxes through an object detection technique in which the given points included in the detected boundary boxes are determined as the feature points.

After that, the medial image and the facial image are superimposed on top of each other with respect to the first feature points and the second feature points (at step S830). In this case, the learning is performed with learning data accumulated with images on which the medical image and the facial image are superimposed on top of each other with respect to the first and second feature points by the specialist, through the machine learning, so that the medical image and the facial image are automatically superimposed on top of each other.

In the case of the image superimposition, the first feature points are matched to the second feature points through the application of MSE, and WMSE is applied to the first feature points and the second feature points included in the predetermined area around the mouth. In specific, an offset value from a specific reference point, enlargement/reduction rates, and rotation angle are calculated so that the distances between the first and second feature points are minimized, and based on the calculated values, the medical image and the facial image are superimposed on top of each other.

On the other hand, the embodiments of the present invention may be implemented by hardware, middleware, microcode, software, and/or any combination thereof. For example, the embodiments of the present invention may be implemented by one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described above, and/or a combination thereof.

For example, further, the embodiments of the present invention are recorded or encoded in computer-readable media including commands. The commands recorded or encoded in the computer-readable media allow a programmable processor or another process to perform methods when they are implemented. The computer readable media includes computer storage media, and communication media having arbitrary media easily transferring computer programs from one place to another place. The storage media may be arbitrarily available media accessible by computers. For example, the computer readable media include random access memory (RAM), read-only memory (ROM), electrically erasable programmable read-only memory (EEPROM), compact disk read-only memory (CD-ROM) or other optical disk storage medium, magnetic disk storage medium or other magnetic storage device, or an arbitrary medium used to restore or store desired program codes to the form of commands or data structures accessible by computers.

The hardware, software, firmware and so on are implemented in the same device or individual devices to support the various operations and functions described in the present invention. Additionally, the units, modules, components as described by the term 'parts' of the present invention may be individually formed as interoperable logic devices. The description on the different characteristics of the modules, units and the like is intended to emphasize the different functional embodiments of the present invention, and it does not mean that they should be operated by the individual hardware or software components. On the contrary, the functions related to one or more modules or units are performed by the individual hardware or software components or may be integrated by the common or individual hardware or software components.

The operations are indicated in the drawings in specific steps, but it should be understood that the illustrated specific steps, the sequential steps, or all the specific steps are not necessarily carried out so as to accomplish desired results. In arbitrary environments, multitasking and parallel processing are more advantageous. Furthermore, it should be understood that the classification of the various components is not needed for all the embodiments of the present invention and that the described components are integrated as a single software product or packaged as a plurality of software products.

As mentioned above, the preferred embodiment of the present invention has been disclosed in the specification and drawings. In the description of the present invention, special terms are used not to limit the present invention and the scope of the present invention as defined in claims, but just to explain the present invention. Therefore, persons skilled in the relevant art can appreciate that many modifications and variations are possible in light of the above teachings. It is therefore intended that the scope of the invention be limited not by this detailed description but rather by the claims appended hereto.

The invention claimed is:

1. A computing device for supporting medical image analysis, the computing device comprising:
at least one memory storing a computer program composed of at least one module for performing the medical image analysis;
a communication device receiving a medical image and a facial image of a patient's head; and
at least one processor;
detecting a plurality of feature points from the facial image using a feature point detection module, which performs machine learning based on artificial neural networks, and
controlling an image superimposition module to superimpose the medical image and the facial image on each other, using a plurality of first feature points displayed in the medical image and a plurality of second feature points, which is a subset of the plurality of feature points from the facial image, as a reference,
wherein the image superimposition module aligns the first feature points with the second feature points by utilizing Mean Squared Error (MSE), and Weighted Mean Squared Error (WMSE) is applied to the first feature points and the second feature points within a predetermined area around a mouth, and
wherein the first feature points are anatomical reference points indicating relative positions of at least one of facial skeleton, teeth, and facial contour.

2. The computing device according to claim 1, wherein the at least one processor controls the feature point detection module, which learns from training data accumulated with a plurality of different images, from which a specialist reads the second feature points.

3. The computing device according to claim 1, wherein the image superimposition module learns from accumulated training data, the accumulated training data including the medical image and the facial image that are superimposed on each other based on the first feature points and the second feature points by a specialist.

4. The computing device according to claim 1, wherein the image superimposition module calculates an offset value from a specific reference point, enlargement or reduction rates, and rotation angle, which minimizes distances between the first feature points and the second feature points, and based on the calculated values, the image superimposition module superimposes the medical image and the facial image on each other.

5. The computing device according to claim 1, wherein the feature point detection module detects a plurality of boundary boxes from the medical image, which is predicted to contain at least some of an individual anatomical features corresponding to the first feature points and determines given points within at least some of the detected boundary boxes as the first feature points.

6. The computing device according to claim 1, wherein the feature point detection module uses a landmark detection technique to detect a plurality of landmarks from the facial image, and wherein the landmark detection technique allows at least some of the points corresponding to the detected landmarks to be determined as the plurality of feature points.

7. The computing device according to claim 1, wherein the feature point detection module detects a plurality of boundary boxes which is expected that at least some of individual facial features corresponding to the plurality of feature points exist from the facial image and detects the plurality of feature points through an object detection technique in which given points included in at least some of the detected boundary boxes are determined as the feature points.

8. A medical image analysis method comprising:
receiving a medical image and a facial image of a patient's head;
detecting, by at least one processor, a plurality of feature points from the facial image using a feature point detection module, which performs machine learning based on artificial neural networks; and controlling, by the at least one processor, an image superimposition module to superimpose the medical image and the facial image on each other, using a plurality of first feature points displayed in the medical image and a plurality of second feature points, which is a subset of the plurality of feature points from the facial image, as a reference, wherein the image superimposition module aligns the first feature points with the second feature points by utilizing Mean Squared Error (MSE), and Weighted Mean Squared Error (WMSE) is applied to the first feature points and the second feature points within a predetermined area around a mouth, and wherein the first feature points are anatomical reference points indicating relative positions of at least one of facial skeleton, teeth, and facial contour.

9. The method according to claim 8, further comprising controlling the feature point detection module, which learns from training data accumulated with a plurality of different images, from which a specialist reads the second feature points.

10. The method according to claim 8, wherein the image superimposition module learns from accumulated training data, the accumulated training data including the medical image and the facial image that are superimposed on each other based on the first feature points and the second feature points by a specialist.

11. The method according to claim 8, wherein the image superimposition module calculates an offset value from a specific reference point, enlargement or reduction rates, and rotation angle, which minimizes distances between the first feature points and the second feature points, and based on the calculated values, the image superimposition module superimposes the medical image and the facial image on each other.

12. The method according to claim 8, wherein the feature point detection module detects a plurality of boundary boxes from the medical image, which predicted to contain at least some of an individual anatomical features corresponding to the first feature points and determines given points within at least some of the detected boundary boxes as the first feature points.

13. The method according to claim 8, wherein the feature point detection module uses a landmark detection technique to detect a plurality of landmarks from the facial image, and wherein the landmark detection technique allows at least some of the points corresponding to the detected landmarks to be determined as the plurality of feature points.

14. The method according to claim 8, wherein the feature point detection module detects a plurality of boundary boxes which is expected that at least some of individual facial features corresponding to the plurality of feature points exist from the facial image and detects the plurality of feature points through an object detection technique in which given points included in at least some of the detected boundary boxes are determined as the feature points.

* * * * *